July 14, 1970      G. D. STINEMETZ      3,520,373
ROW MARKER MEANS HAVING MARKER AND WING IMPLEMENT RAISER MEANS Filed April 15, 1968      2 Sheets-Sheet 1

INVENTOR.
GODFRIED D. STINEMETZ

BY
ATTORNEYS

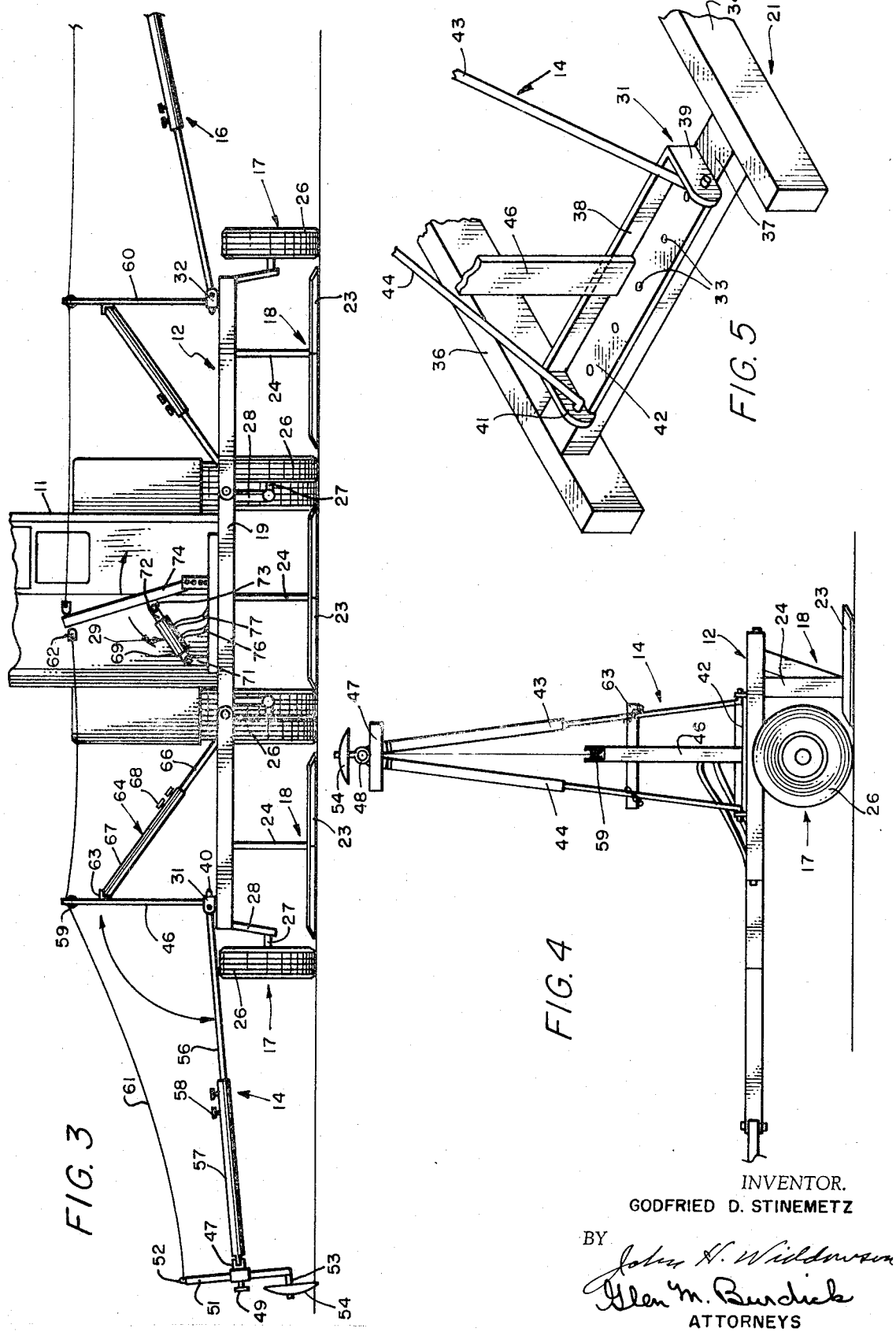

United States Patent Office 3,520,373
Patented July 14, 1970

3,520,373
ROW MARKER MEANS HAVING MARKER AND WING IMPLEMENT RAISER MEANS
Godfried D. Stinemetz, 1224 Old Manor,
Garden City, Kans. 67846
Filed Apr. 15, 1968, Ser. No. 721,284
Int. Cl. A01b *39/28, 49/04*
U.S. Cl. 172—130                             8 Claims

ABSTRACT OF THE DISCLOSURE

A marker and wing implement raiser means is pivotally connected to a frame connected to a plurality of support wheel assemblies. The frame is provided with a central frame assembly having opposed wing frame assemblies pivotally connected thereto. Adjustable marker means are pivotally mounted on the outwardly extending end portions of the opposed wing frame assemblies for movement between an operative ground-engaging position and an inoperative raised position. The marker and wing implement raiser means is mounted on the central frame assembly and interconnects the marker means so that when one of the marker means is in the ground-engaging position the other marker means is in the inoperative raised position. The raiser means also interconnects the central frame assembly and the opposed wing frame assemblies so that the opposed wing frame assemblies can be moved upwardly with respect to the central frame assembly thus facilitating the movement of the marker means and the frame from one location to another.

---

This invention relates to agricultural implements. In one aspect it relates to an agricultural implement especailly adapted for multi-row operation. In another aspect it relates to an adjustable row marker apparatus for agricultural implements. In another aspect it relates to a row marker apparatus for agricultural implements having a pair of adjustable marker means interconnected so that when one marker means is in a lowered ground engaging position the other marker means is in a raised inoperative position. In another aspect it relates to a power means mounted on a frame and connected to a lever means so that the marker means and the opposed wing frame assemblies of a frame can be raised thus facilitating the movement of the implement from one location to another.

Markers are known having a pair of markers interconnected so that the positioning of one marker in a lowered ground-engaging position causes the other marker to be positioned in a raised, inoperative position. However, many times the raising of one of the markers and the lowering of the others is accomplished by applying force directly to the markers themselves to shift them from one position to another, and, in some instances, there is a separate control for each marker. Previous markers have been operated by various complicated arrangements, such as the independent control means of each marker, which have disadvantages in that the expense of maintaining the two control means in operative condition at all times is undesirable and many times the implement does not function properly because of malfunction of one of the control means. Further, the implements of the prior art do not provide a means for raising wing frame assemblies of a sectional frame means so that the entire implement can be readily transported from one locality to another when desirable. The need for providing the raising of the wing assemblies of a multi-frame section is especially desirable today wherein pulling vehicles, such as tractors, are capable of pulling multi-segment frames having agricultural implements mounted thereon so that large swaths of ground can be worked in a single pass thus providing an efficient, time-saving, and economical way for a man to farm considerably more ground than by prior methods. However, as mentioned, due to the large size of the agricultural implements now being employed not only is it desirable to provide a means for raising the marker means and the end sections of a multi-sectional frame means, but also means are desired for adjusting the length of the row markers so that the row markers can be varied depending upon the desired length of the implement being employed.

The present invention is directed toward overcoming the above-mentioned and other disadvantages of the previous row markers by providing a marker and wing implement raiser means wherein the marker is adjustable to compensate for changes in the desired length of the implement being used, and the wing frame assemblies of a multi-sectional implement can be raised for transporting the implement from one location to another. Further, a power operated lever means is provided which is employed to operate the wing portions of the implement and thus narrow the implement and the same power operates the raising and lowering of the marker means.

According to the present invention a marker and wing implement means is provided having an improved power operated lever means mounted on a frame which is connected to a plurality of support wheel assemblies. The frame is a multi-frame structure having a central frame assembly and opposed wing frame assemblies pivotally connected to the central frame assembly. The central frame assembly and thus the entire assembly, is adapted to be connected to a pulling vehicle or lifted thereby, such as a conventional tractor. Marker means are pivotally mounted on the outer end portion of the opposed wing frame assemblies and are adapted for movement between an operative ground-engaging position and an inoperative raised position. The power operated lever means interconnect the marker means so that when one of the marker means is in a ground-engaging position the other marker means is in the inoperative raised position. The power operated lever means likewise interconnects the central frame assembly and the opposed wing frame assemblies so that the opposed wing frame assembly and thus the marker means mounted thereon can be moved upwardly with respect to the central frame assembly for movement of the marker and wing implement raiser means from one location to another.

Further, according to the invention, row marker means are provided which are readily adjustable so that the length of the row marker extending from the wing frame assembly can be varied so that additional segments of frame structures can be added to the frame structure or, sections can be removed and the same marker means can be employed regardless of the number and length of sections employed in the frame.

Further, according to the invention, support and locking means are provided so that when the opposed wing frame assemblies are in a raised position and thus the marker means, the support and lock means can be secured thus preventing slippage and dropping of either the marker means or the wing frame assemblies thus preventing damage to either the marker means or the wing frame assembly.

An object of the present invention is to provide an improved row marker implement.

Another object of the invention is to provide a row marker that is simple in construction, easy to operate, durable, and economical.

Another object of the invention is to provide a power operated lever means which is employed to raise the marker means and the wing frame assemblies.

Another object of the invention is to provide a row marker which can be readily adjusted in length thus providing a more flexible row marker attachment.

Another object of the invention is to provide a row marker implement having a support and locking means mounted on the frame so that the row markers and wing frame assemblies can be secured and stabilized when in a raised, folded position thus preventing damage to either the marker or wing assemblies when the implement is being moved from one location to another.

Another object is to provide such a row marker means which is quickly and easily attachable to and detachable from existing equipment and which, in and of itself, possesses adjustability thus allowing it to be adapted to equipment of various sizes.

Another object is generally to improve the design, construction, and flexibility of row markers.

Yet another object of this invention is to provide a power operated lever means for controlling the marker means and the opposed wing assemblies of a sectional agricultural implement which does not suffer from the disadvantages of the prior art devices and yet which functions equal to or superior to the markers of the prior art.

Other objects and advantages of the present invention will be apparent to those skilled in the art from a study of the drawings, the written disclosure, and the appended claims.

Drawings accompany and are a part of this disclosure. These drawings depict preferred specific embodiments of the row marker means of the invention, and it is to be understood that these drawings are not to unduly limit the scope of the invention. In the drawings.

FIG. 3 is a rear elevational view of the row marker means of the present invention showing lever means interconnecting the marker means so that when one of the marker means is in a ground-engaging position another of the marker means is in an inoperative raised position.

FIG. 4 is a side elevational view depicting the marker in a raised position similar to FIG. 1.

FIG. 5 is a partially broken enlarged perspective view of the mounting means of the row marker means on wing frame assemblies of the frame structure supporting the agricultural implement.

Figure 1:
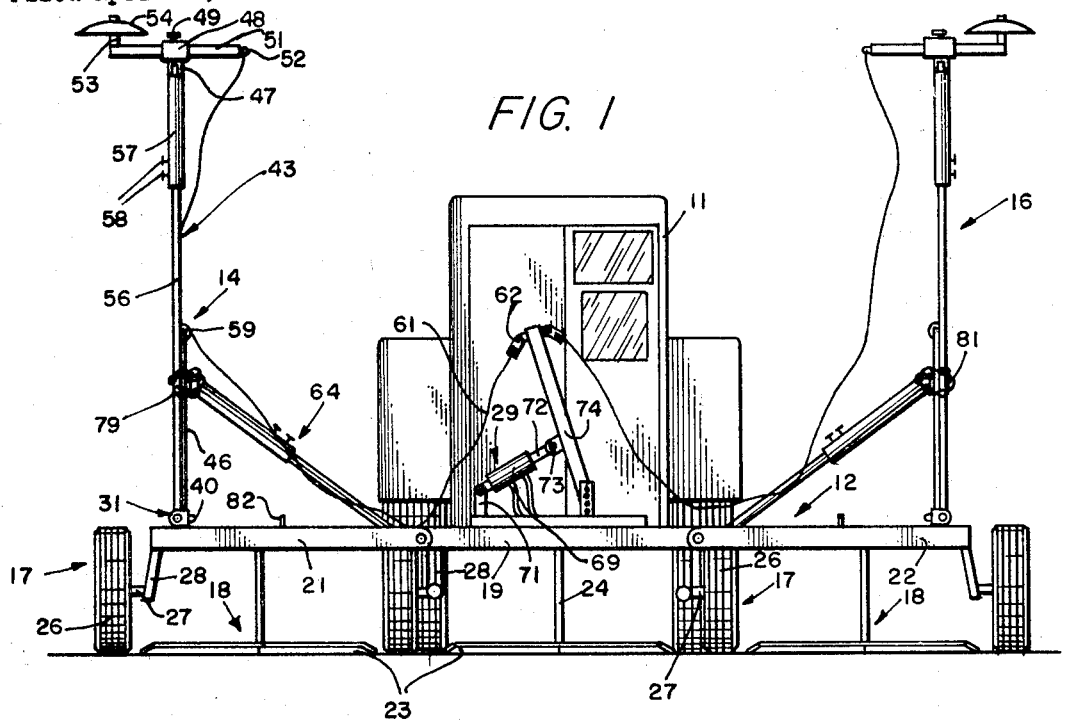
FIG. 1 is a rear elevational view of a tractor having the farm implement attached thereto and having mounted thereon the marker means of the present invention and depicting the markers in a raised position.

In the following is a discussion and description of the invention made with reference to the drawings wherein the same reference numerals are used to indicate the same or similar parts and/or structure. The discussion and description is of preferred specific embodiments of the new row marker implement means of the invention, and it is to be understood that the discussion and description is not to unduly limit the scope of the invention.

Referring to the drawings in detail, and particularly to FIGS. 1 to 4, the towing means, such as farm tractor 11 is illustrated having an implement frame means 12 connected thereto. A pair of row marker means indicated generally by 14 and 16 are pivotally connected to the opposed end portions of implement frame means 12.

Implement frame means 12 is held in an elevated position above the ground surface by space support wheel assemblies 17 and having a plurality of earth working means, such as plow assemblies 18, secured thereto. Frame means 12 includes a central frame assembly 19 and opposed wing frame assemblies 21 and 22 pivotally connected to the opposed end portions of central frame assembly 19 of frame means 12. Each of wing frame assemblies 21 and 22 and central frame assembly 19 are provided with a plow assembly 18. Plow assembly 18 includes a large V-shaped blade member 23 engageable with soil for separating and lifting the same generally horizontally and a vertical support member 24 secured to the forward portion of blade member 23. The upper end portions of support member 24 are connected to wing frame assemblies 21 and 22 and central frame assembly 19 by any suitable means which are known in the art. Plow assemblies 18 can either be provided in a staggered relationship to provide an overlapping of V-shaped blade members 23, thus insuring the complete separation of the soil, or plow assemblies 18 can be positioned so as to be substantially aligned and thus V-shaped blade members 23 do not overlap. The positioning of V-shaped blade members 23 of the plow assembly can be varied depending upon the desires of the farmer.

Space support wheel assemblies 17 which are employed to maintain frame means 12 in an elevated position above the ground are each provided with a wheel member 26 having an axle member 27 operatively connected thereto and allowing rotation of wheel member 26. The other end of axle member 27 is then secured to a support member 28 which is affixed to frame means 12 by any suitable means which are well known in the prior art such as by welding, bolting, clamping, and the like. Wheel assemblies 17 can be positioned so that the outmost support wheel assemblies are forwardly or rearwardly of the other two such wheel assemblies and the wheel assemblies function in a spaced relationship so as to be self-supporting when disconnected from tractor 11 or wheel assemblies 17 can be substantially aligned again depending merely upon the desires of the farmer. Wheel assemblies 17, connected to central frame assembly 19 of implement frame means 12, are connected to the hydraulic system of tractor 11 by means well known in the art so that central frame assembly 19 of frame means 12, and thus the plow assembly 18 attached thereto can be moved to a raised position or lowered to a ground-engaging working position.

Figure 2:
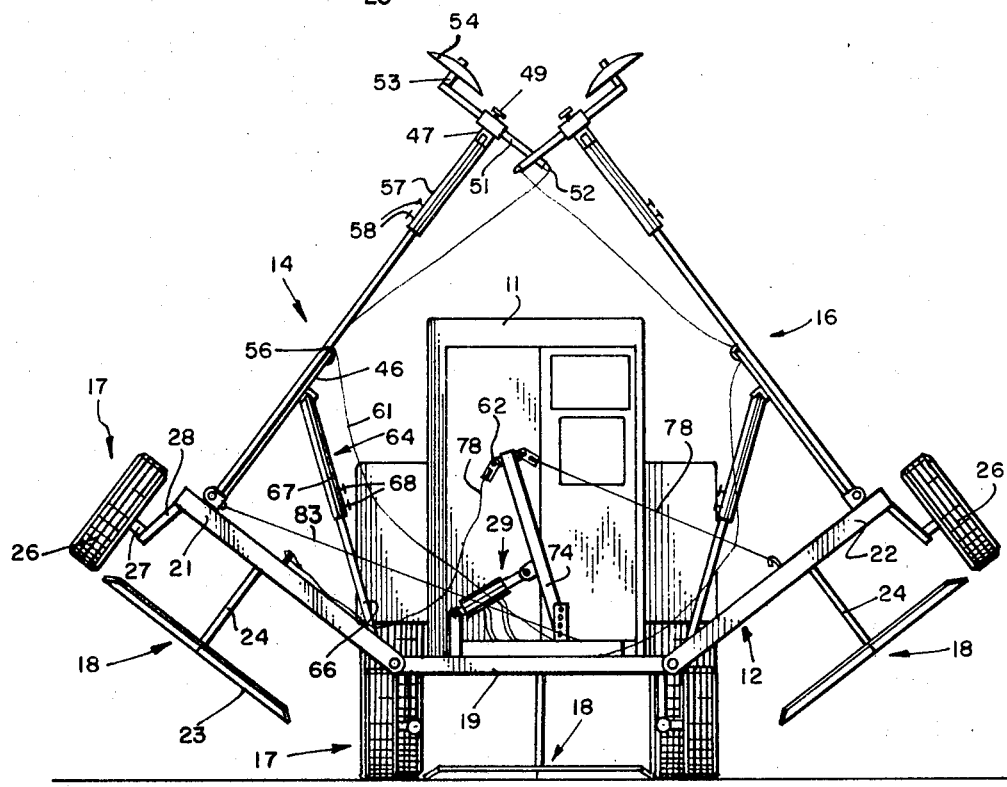
FIG. 2 is a rear elevational view similar to FIG. 1 except that the wing frame assemblies of the frame for the agricultural implements are depicted in a raised position.

Power means 29 for operating lever means 74 are mounted on central frame assembly 19 of implement frame means 12 and lever means 74 interconnects with row marker means 14 and 16 so that row marker means 14 and 16 can be raised or lowered with respect to frame means 12, or opposed wing frame assemblies 21 and 22 can be raised with respect to central frame assembly 19 of frame means 16 as shown in FIG. 2. Row marker means 14 and 16 are pivotally mounted to support members 31 and 32 which are in turn secured to the outer end portions of wing frame assemblies 21 and 22, respectively, by any suitable means, such as bolts 34 (see FIG. 5).

Referring now to FIGS. 4 and 5, a detailed view of wing frame assembly 21 having support member 31 and row marker means 14 mounted thereon is shown. Since wing frame assemblies 21 and 22 are identical in construction, except that one is a right hand member and the other is a left hand member, and the same is true of support members 31 and 32 and row marker means 14 and 16, only wing frame assembly 21, support member 31, and row marker means 14 will be described.

Wing frame assembly 21 is shown as a rectangular shaped frame member having parallel side members 34 and 36 and interconnecting end member 37 which is secured near the end portion of parallel side members 34 and 36 by any suitable means known in the art, such as welding, bolting, and the like. Another interconnecting end member (not shown) is similar to interconnecting end member 37 and is secured near the other end of parallel side members 34 and 36 in a similar manner. Interconnecting end member 37 is provided with a plurality of apertures (not shown) which are aligned and communicate with apertures within support member 31 so that support member 32 and thus marker means 14 can be affixed to wing frame assembly 21 by bolts 33.

Support member 31 is provided with an elongated substantial U-shaped member having a back support member 38 and opposed end members 39 and 41. End members 39 and 41 are secured to the opposed end portions of back support member 38 in a substantially perpendicular manner to back support member 38 by any suitable means, such as welding, so as to maintain end members 39 and 41 substantially parallel to each other. A base member 42 is secured to the lower portions of back support member 38 and end members 39 and 41, as shown, by welding and the like. A plurality of apertures are positioned within base member 42 and aligned with apertures in interconnecting end member 37 of opposed wing frame assembly 21 so that support member 31 can be affixed to wing frame assembly 21 by bolts 33. A hook-type member 40 is mounted on the back side of back support member 38 and its function will be discussed hereinafter.

End members 39 and 41 of support member 31 are each provided with an aperture positioned therein so that arm members 43 and 44 of marker means 14 can be positioned therein thus pivotally securing arm members 43 and 44 and thus marker means 14 to support member 31 and thus to wing frame assembly 21. Arm members 43 and 44 can be maintained within the apertures in end members 39 and 41 by any suitable means, such as tension, locking pin elements, and the like. An upright support member 46 is secured to back support member 38 as shown in upright support member 36 and its function will be described in detail hereinafter.

Returning now to FIGS. 1 to 4, row marker means 14 and 16 which are substantially identical except that one is of left-hand construction and the other is of right-hand construction are removably mounted on the outwardly extending end portions of opposed wing frame assemblies 21 and 22. Since row marker means 14 and 16 are substantially identical, the following discussion of row marker means 14 should suffice for both.

Row marker means 14 is provided with a pair of outwardly converging arm members 43 and 44 which are secured to a connecting member 47 at their converging end portions. Connecting member 47 is secured to a sleeve member 48 having a set screw 49 threadably engaged in a threaded aperture in sleeve member 48 with the inner end of set screw 49 engaging rod member 51 to anchor rod member 51 at a selected position. The upwardly extending end portion of rod member 51 is provided with a connecting means, such as a ring type member 52, and the lower end portion of rod member 51 is secured to axle member 53. Disc member 54 is rotatably mounted on the outer end of axle member 53 and disc member 54 functions to open a position indicating furrow as the implement moves over the field. The furrow is utilized as a guide to maintain substantially uniform distance between adjacent outside rows.

Arm members 43 and 44 of row marker means 14 are each provided with a rod member 56 which is pivotally connected at one end portion to support member 31 which in turn is connected to wing frame assembly 21. The other end of rod member 56 is slidably positioned within cylindrical member 57 and cylindrical member 57 is constructed so as to telescopically receive rod member 56 so that the overall length of marker arms 43 and 44 of row marker means 14 can be adjusted to accommodate for the marking of different lengths of rows. A locking means, such as set screws 58, are threadably engaged in a threaded aperture in cylindrical member 57. The inner end of set screws 58 engages rod member 56 to anchor rod member 56 at a selected position within cylindrical member 57 thus providing the desired overall length of marker arms 43 and 44.

Upright support member 46 is secured to support member 31 and thus to wing frame assembly 21 when support member 31 is secured to wing frame assembly 21 by bolts 33 and the like. A similar support member is likewise secured to support member 32 and since they are similar in construction only the description of upright support member 46 is deemed necessary. Upright support member 46 is mounted on support member 31 so as to be substantially perpendicular to the horizontal plane of opposed wing frame assembly 21 of frame means 12. A guide means, such as pulley means 59, is rotatably connected to the upwardly extending end portion of upright support member 46 and is adapted to receive and guide a connecting means, such as cable 61, which interconnects row marker means 14 and 16 through lever means 74 mounted on central frame assembly 19 of frame means 12. Cable 61 is connected to the connecting means, such as ring member 52 affixed to rod member 51 at one end, passes over pulley means 59 and then is secured to lever means 74 by connecting members 62. As is readily apparent, cable 61, upright support member 46 and lever means 74, operating in response of power means 29 cooperate so that row marker means 14 is pivotable between the lowered working position, shown in FIG. 3 in which disc member 54 is in engagement with the ground and the raised position when row marker means 16 is in the lowered working position. Further, power means 29, which will be discussed in detail hereinafter, and lever means 74 are constructed to also raise opposed wing frame assemblies 21 and 22 when it is necessary to transport the implement from one location to another.

Upright support member 46 is provided with a cross bar member 63 secured thereto intermediate upright support member 46 and adapted to hold row marker means 14 in a relatively fixed adjacent position by any suitable means such as chains, bolts, and the like for transportation of the same. Brace member 64 is connected at one end to cross bar 63 and to wing frame assembly 21 at the other end. Brace member 64 is a telescoping member and is provided with a rod member 66 positioned within cylindrical member 67 at one end. Set screws 68 are threadably engaged in the threaded aperture of cylindrical member 67, with the inner end of set screws 68 engaging rod member 66 to maintain rod member 66 at a selected position. The overall length of brace member 64 is thus changeable so that row marker means 14 and wing frame assembly 21 can be readily positioned as shown in FIG. 1 or 3 wherein brace member 64 is in a fixed position by causing set screw 68 within cylindrical member 67 to contact rod member 66 and thus prevent movement of marker arm of the length of brace member 64 can be shortened and the set screw reset when the wing frame assemblies 21 and 22 are in a raised position, such as shown in FIG. 2.

Power means 29, such as a piston and cylinder assembly 69 is pivotally connected to a support bracket 71 which is mounted on central frame assembly. A piston member (not shown) is mounted within cyclinder 69 having an outwardly extending piston rod 72 pivotally connected to a second support bracket 73 mounted on lever means 74, such as an upright member, which is in turn mounted on central frame assembly 19. Piston and cylinder assembly 69 is a dual actuated type having fluid lines 76 and 77 connected thereto, each selectively operable to either receive or supply control fluid into cylinder 69 to move the piston and interconnected piston rod 72 and thus lever means 74. It is obvious that the supply lines 76 and 77 are connected to the hydraulic system of tractor 11 whereupon a control lever (not shown) may be operated to provide desired movement of the piston and cylinder assembly 69. Fluid can be supplied under pressure to move piston rod 72 inwardly relative to cylinder 69 thereupon causing pivotal movement of lever means 74 and thus raising row marker means 16, and lowering row marker means 14 into operative ground-engaging position, as shown in FIG. 1 by cables 61 which are connected to row marker means 14 and 16, respectively, and lever means 74, as has been previously discussed. Further, when it is desired to raise row marking means 14 and 16 and opposed wing frame assemblies 21 and 22 to a raised position for transportation of the entire implement, as shown in FIG. 2, power means 29 is employed to do same with second connecting means 78 mounted thereto which will be explained hereinafter.

When it is desirable to position row marker means 14 and 16 in the transporting to a position as shown in FIG. 2 the row marker means 14 and 16 are moved to a position substantially perpendicular to wing frame assemblies 14 and 16 as shown in FIG. 1. As is readily apparent, row marker means 14 and 16 are thus positioned parallel and adjacent end support members 46 and 60, respectively, and thus row marker means 14 and 16 are secured thereto by any suitable means such as chain members 79 and 81 as shown in FIG. 1. When row marker means 14 and 16 are in the perpendicular position with respect to wing frame assemblies 21 and 22 as shown in FIG. 1, and it is desirable to raise wing frame assemblies 21 and 22 as shown in FIG. 3, a second connecting means, such as a cable 78 is secured to hook member 82 mounted on wing frame assemblies 21 and to lever means 74 and power means 29 is activated thus causing the left-hand wing frame assembly 21 to be raised. When left-hand wing frame assembly 21 is in the raised position a fastening means such as cable 83 is secured to hook member 40 and to central frame assembly 19 as shown in FIG. 2 thus releasing lever means 74 so that it can be employed to raise the right-hand frame wing assembly 22. However, upon raising the second wing frame assembly, second cable 78 is utilized to secure the wing frame assembly in position. As is readily apparent, the same power means is employed not only to control and move the row marker means but also to raise the opposed wing frame assemblies thus providing a dual purpose power means without the need for complicated and expensive equipment.

While the invention has been described in conjunction with preferred specific embodiments thereof, it will be understood that the description is intended to illustrate and not to limit the scope of the invention, which is defined by the appended claims.

I claim:
1. A row marker apparatus comprising:
   (a) a frame connected to a plurality of support wheel assemblies, said frame having a central frame assembly connectible to a pulling vehicle and opposed wing frame assemblies pivotally connected to said central frame assembly;
   (b) adjustable marker means pivotally mounted on the outer end portions of said opposed wing frame assemblies for movement between an operative ground-engaging position and an inoperative raised position;
   (c) lever means pivotally connected in one end portion to said central frame assembly;
   (d) a first connecting means connectible to interconnect said adjustable marker means and secured to said lever means so that when said marker means are extended and are in a lowered position the movement of said lever means raises one of said marker means to a raised inoperative position and lowers the other to a ground engaging position;
   (e) upright support means mounted on the opposed outer end portions of said wing frame assemblies and adapted to maintain said marker means in a substantially perpendicular position with respect to the horizontal plane of said frame when said marker means are raised to said perpendicular position;
   (f) a second connecting means connectible to said opposed wing frame assemblies and said lever means so that upon activation of said lever means one of said wing frame assemblies is caused to be raised upwardly with respect to said central frame assembly for securing in such a raised position and the said second connecting means when connected to the other of said wing frame assemblies and said lever means and such is activated said other of said wing frame assemblies is likewise caused to be raised for securing thus permitting transportation of the row marker apparatus from one location to another without damage to the same.

2. The row marker apparatus according to claim 1 which includes a power means pivotally connected in one end portion to said central frame assembly and pivotally connected in the other end portion to said lever means, said power means being adapted to cause movement of said lever means in response to activation and movement of said power means.

3. The row marker apparatus according to claim 1 wherein each of said adjustable marker means comprises:
   (a) a pair of outwardly converging arm members each of said arm members having a rod member pivotally connected in one end portion to one of said wing frame assemblies and a cylindrical member adapted to telescopically receive the other end portion of said rod member thus allowing the overall length of said arm members to be adjusted;
   (b) a locking means mounted on each of said cylindrical members and communicating with said rod member to secure said rod member in said cylindrical member;
   (c) a connecting member mounted on the converging end portions of said cylindrical members to secure same in a relatively fixed position; and
   (d) a disc means secured to said connecting member, said disc means being adapted to be adjusted in height and to open a position indicating furrow in the ground.

4. The row marker apparatus according to claim 3 which includes a detachable support member mounted on the outer end portions of said wing frame assemblies for securing the adjustable marker means to said frame comprising:
   (a) an elongated, substantially U-shaped member having aligned apertures in the end portion of said U-shaped member for pivotally receiving said adjustable marker means;
   (b) a base member secured to the lower surface of said substantially U-shaped member, said base member having a plurality of apertures therein which are aligned and communicate with a plurality of apertures positioned within said wing frame assemblies;
   (c) a plurality of bolt members positioned within said aligned apertures for securing said base member and thus said substantially U-shaped member to said wing frame assemblies; and
   (d) a hook member mounted on the exterior surface of said U-shaped member.

5. The row marker apparatus according to claim 1 which includes a telescoping brace member secured in one end portion to each of said wing frame assemblies and to said upright support means in the other end portions comprising:
   (a) a rod member;
   (b) a cylindrical member adapted to telescopically receive said rod member in one end portion; and
   (c) a locking means mounted on said cylindrical member and communicating with said rod member so that said rod member can be secured within said cylindrical member.

6. The row marker apparatus according to claim 1 which includes a second hook member mounted on each of said wing frame assemblies so that said second connecting means can be secured thereto thus allowing said lever means to raise said wing frame assembly in response to movement of said power means.

7. The row marker apparatus according to claim 1, wherein:
   (a) said first and second connecting means are cable members; and
   (b) said upright support means are provided with a cross brace member at the upwardly extending portion thereof and having a chain member secured thereto for maintaining said marker means in an adjacent, substantially fixed position when said marker means are positioned substantially perpendicular to said frame.

8. The row marker apparatus according to claim 1 which includes a fastening means connected to said hook member of said detachable support means and to said central frame assembly when said lever means has caused the first of said wing frame assemblies to be raised thus securing said wing frame assembly in place and allow said lever means to be released to thus raise the other of said wing frame assemblies.

References Cited

UNITED STATES PATENTS

| | | | |
|---|---|---|---|
| 2,828,680 | 4/1958 | Johnson | 172—310 |
| 3,139,941 | 7/1964 | Graham et al. | 172—130 |
| 3,321,028 | 5/1967 | Groenke | 172—456 X |
| 3,452,825 | 7/1969 | Morris | 172—127 |

ROBERT E. PULFREY, Primary Examiner

W. J. CONLON, Assistant Examiner

U.S. Cl. X.R.

172—311, 456, 469